UNITED STATES PATENT OFFICE.

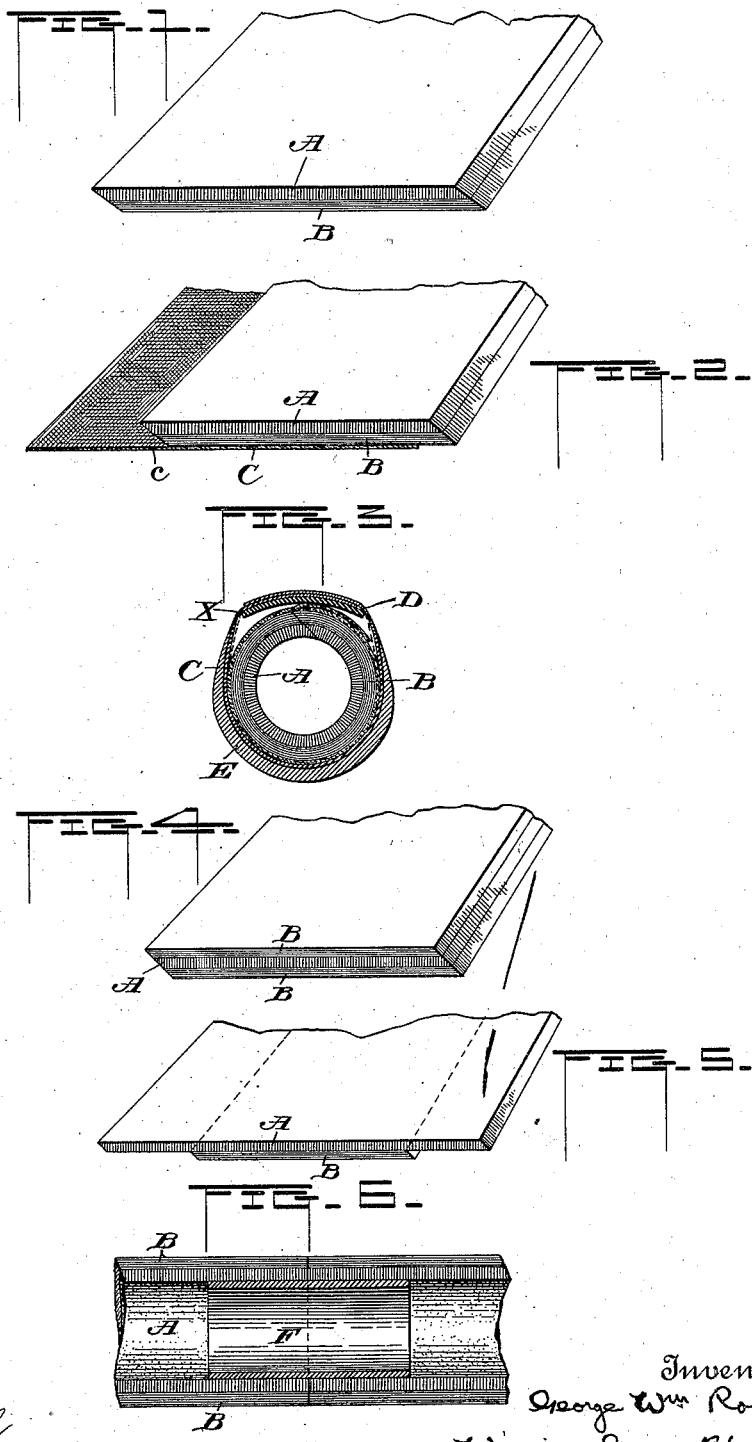

GEORGE WILLIAM ROWE AND WILLIAM GEO. HEYS, OF MANCHESTER, ENGLAND.

PNEUMATIC TIRE.

SPECIFICATION forming part of Letters Patent No. 558,703, dated April 21, 1896.

Original application filed December 24, 1891, Serial No. 416,068. Divided and this application filed November 21, 1895. Serial No. 569,661. (No model.) Patented in England July 17, 1891, No. 12,152; in Austria-Hungary December 17, 1891, No. 15,277 and No. 67,793; in Sweden December 19, 1891, No. 6,014; in Norway December 19, 1891, No. 2,741; in Spain December 23, 1891, No. 12,826; in France December 23, 1891, No. 218,235; in Italy December 24, 1891, LX, 476; in Switzerland December 26, 1891, No. 4,599, and in Belgium December 28, 1891, No. 97,734.

*To all whom it may concern:*

Be it known that we, GEORGE WILLIAM ROWE and WILLIAM GEORGE HEYS, citizens of the United Kingdom of Great Britain and Ireland, residing at Manchester, in the county of Lancaster, England, have invented certain new and useful Improvements in Pneumatic Tires, of which the following is a specification.

This invention has been patented to us in the following countries: Great Britain, No. 12,152, dated July 17,1891; Austria-Hungary, No. 15,277 and No. 67,793, dated December 17, 1891; Italy, LX, 476, dated December 24, 1891; Spain, No. 12,826, dated December 23, 1891; France, No. 218,235, dated December 23, 1891; Sweden, No. 6,014, dated December 19, 1891; Norway, No. 2,741, dated December 19, 1891; Belgium, No. 97,734, dated December 28, 1891, and Switzerland, No. 4,599, dated December 26, 1891.

The invention relates to pneumatic and other similar elastic tires which contain air when in use; and its objects are to prevent leakage of the air should the tire become punctured or cut and to strengthen the construction.

This application is a division of our application filed December 24, 1891, Serial No. 416,068.

For the purposes of this invention the air-containing tube or part of the tire is constructed wholly or in part of india-rubber, india-rubber compound, or other similar soft elastic material, with that part of the tube or tire which is liable to be punctured or cut compressed or in compression. We effect the compression by employing an additional layer or layers of india-rubber or the like cemented to the main layer when in a stretched condition, so that upon releasing the additional layer its contraction operates to compress the main layer. It is preferred in all cases to employ some means for preventing the stretching of the outer part of the air-containing tube or part of the tire and thus maintaining the state of compression in the india-rubber or other similar material. This may be accomplished without interfering with the flexibility of the tire—for example, by cementing or molding a strip of canvas upon it.

The accompanying drawings illustrate in what manner the invention may be carried into practical effect.

Figure 1 shows an additional layer stretched and cemented to the main layer. Fig. 2 shows the main layer compressed. Fig. 3 shows the composite strip made up into a tire. Figs. 4 and 5 show modifications. Fig. 6 shows the joint for uniting the ends of the tire.

A strip or layer of normal india-rubber A, Fig. 1, is cemented upon a strip or layer of stretched india-rubber B or between two strips of such india-rubber, as indicated by Fig. 4. Upon the liberation of the stretched india-rubber it will, in endeavoring to return to its normal condition, put the strip A into compression, as shown in Fig. 2. The composite strip is then made up into a tube, preferably with the compressed strip inside, and it may be prevented from again expanding by cementing canvas C or the like upon the compound material. The canvas is cut to give a flap *c* along one edge, which is cemented down upon the opposite part of the tube.

It is evident that the main layer or strip A may be formed into a tube before the stretched strip or layer B is cemented to it, the effect being the same in both cases.

If desired, the stretched layer may be narrower than the main layer, so as to put only a portion of said main layer into compression when released, as shown in Fig. 5.

The tube of compressed india-rubber or in which the india-rubber is wholly or partly in a state of compression may be fixed upon the rim of the wheel in practically the same manner and by the same means as those adopted at present in similarly fixing ordinary pneumatic tires. Thus in Fig. 3, which shows the tire and rim X in cross-section, the tube of compressed india-rubber is attached to the rim by a piece of cloth D, completely encircling the tube and rim, as shown, or by means of flaps attached to or woven with the canvas tube C, incorporated with the rubber, as indicated by dotted lines. The tube and connecting piece or flaps are then covered with a piece of india-rubber E, which forms the tread and, coming into contact with the ground, prevents destruction of the cloth. If desired, the tread may be formed with cloth flaps for attaching to the rim, the air-tube in this case being secured to the rim by the tread. In the method illustrated in Fig. 3 the compressed air-tube, the encircling cloth, and the tread are all firmly cemented together.

The joint between the two ends of the tube may be made air-tight by cementing or by other suitable means and, as is well understood, by means of a short rubber lining-tube F, which enters both ends, and the tightness of the joint secured by cement.

It is arranged in all cases that nothing can puncture or cut into the air-space of the tire without passing through the compressed india-rubber or other similar soft elastic material.

It will be understood that if the tire is punctured or cut while inflated the compressed condition of the india-rubber will cause it to close up the perforation and prevent the escape of the contained air.

Having now particularly described and ascertained the nature of our said invention and in what manner the same is to be performed, we declare that what we claim is—

1. A pneumatic tire composed of a rubber tube maintained in a state of compression by an additional layer of rubber cemented when in a stretched condition to the rubber composing the tube, substantially as described.

2. A pneumatic tire composed of a tube formed from a normal strip of rubber upon which a stretched strip of similar material has been cemented and then released, substantially as described.

3. A pneumatic tire composed of a tube formed from a strip of rubber upon which a stretched strip of similar material has been cemented and then released, and a covering of canvas or other non-stretching material cemented upon the outside of said tube, substantially as described.

4. The method of making an air-tube for a pneumatic tire which consists in cementing or otherwise securing to a normal strip of rubber a stretched strip of similar material, then permitting the stretched strip to contract and compress the normal strip, and then constructing the tube from the composite strip thus formed, preferably with the original normal strip inside, substantially as described.

In testimony that we claim the foregoing as our invention we have signed our names, in presence of two witnesses, this 25th day of September, 1895.

GEORGE WILLIAM ROWE.
WILLIAM GEO. HEYS.

Witnesses:
GEORG VOHL,
ARTHUR BAKER.